June 12, 1923.
J. H. JACOBS
SUPPORT FOR COOKING VESSELS
Filed Jan. 16, 1922
1,458,296
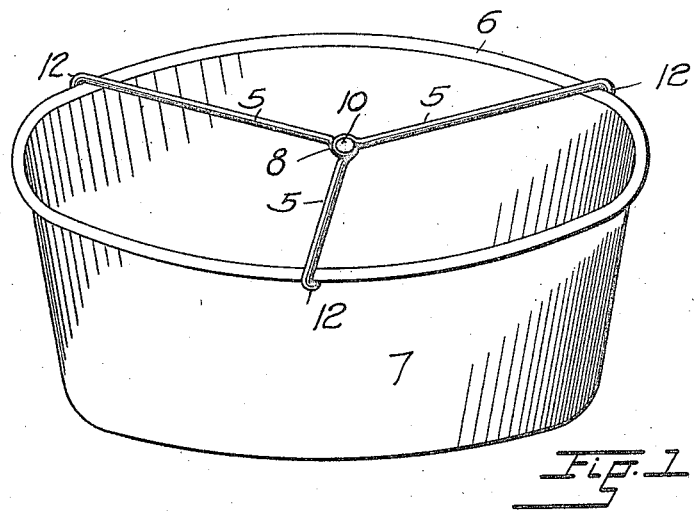
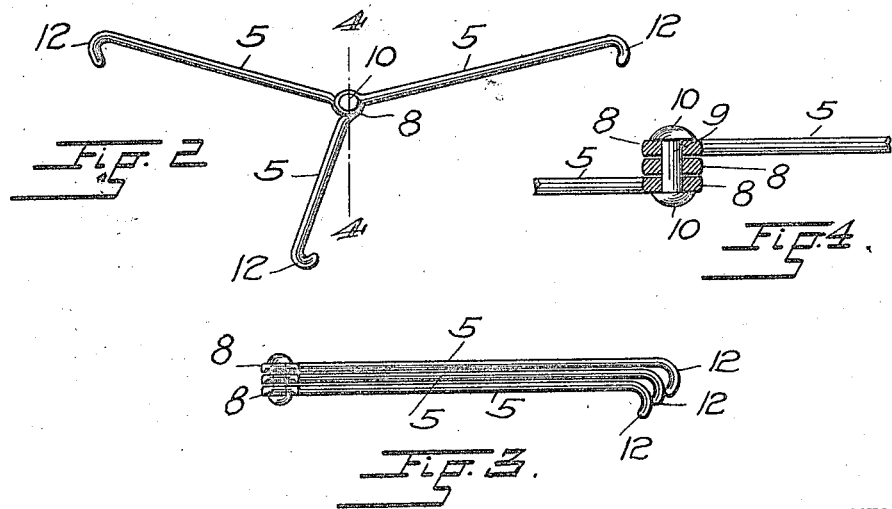
INVENTOR.
JOSEPH H. JACOBS
BY
ATTORNEY.

Patented June 12, 1923.

1,458,296

UNITED STATES PATENT OFFICE.

JOSEPH H. JACOBS, OF DENVER, COLORADO, ASSIGNOR TO 3-IN-ONE PRESSURE COOKER COMPANY, OF DENVER, COLORADO, A CORPORATION OF COLORADO.

SUPPORT FOR COOKING VESSELS.

Application filed January 16, 1922. Serial No. 529,522.

*To all whom it may concern:*

Be it known that I, JOSEPH H. JACOBS, a citizen of the United States, residing at Denver, in the county of Denver and State of Colorado, have invented certain new and useful Improvements in Supports for Cooking Vessels, of which the following is a specification.

My invention relates to supports for cooking vessels and its principal object is to provide a frame of very simple construction which in connection with a pan, pot, dish or other similar cooking utensil, is adapted to support another article in superposed relation thereto.

A further object of my invention is to provide an attachment of the character hereinabove referred to which is collapsible and, when not in use, may be folded into compact form, and still another object is to provide a frame of the above described type which has the additional advantage of being capable of supporting a dish, plate, pan or other vessel upon a table, a stove or other surface is spaced relation thereto.

With the above objects in view, my invention consists in the construction and arrangement of members illustrated in the accompanying drawings in the various views of which corresponding parts are similarly designated and in which Figure 1 is a perspective view of a cooking vessel with my supporting frame in its operative position on the rim thereof;

Figure 2, a perspective view of the frame detached from the vessel;

Figure 3, an elevation showing the frame in its folded condition; and

Figure 4, a section taken on the line 4—4, Figure 2, and drawn to an exaggerated scale.

Referring more specifically to the drawings, the frame consists of three straight and rigid arms 5, preferably made of wire and pivotally connected at one end to conjointly form a spider-frame which is adapted to span the circular rim 6 of a pan, dish or other cooking vessel 7, as shown in Figure 1.

The ends of the arms at which they are connected, are formed into circular eyes 8 which are arranged in axial alinement to receive a pivot-pin 9, the ends of which are upset as at 10, to hold the arms against relative displacement.

The opposite free ends of the arms are formed into hooks 12 which are adapted to embrace and grip the rim of the vessel to clampingly hold the frame in place thereon, and which also are capable of functioning as feet when the device is used to support a vessel or other article upon and in spaced relation to the surface of a stove or table.

The three arms of the frame are of unequal lengths so that they may be folded together with their hook-shaped extremities nested one inside another, as shown in Figure 3 of the drawings.

It will be apparent that the spider-frame construction as shown and described, is applicable to vessels of different shapes and diameters; that the form and interconnection of its members enables them to conjointly support articles of considerable weight without deformation, sag or breakage; and that when folded together, the members form an article so compact that it is easily placed in the pocket of a dress or apron or put away in a knife box, drawer or other receptacle of limited dimensions.

My invention is particularly adapted for use in connection with pressure cookers since it permits of placing several vessels or other articles one above the other, in one container without waste of space, and so as not to interfere with each other.

Having thus described my invention, what I claim and desire to secure by Letters Patent is:

1. As a new article of manufacture, a plurality of straight and rigid rods, pivotally connected at one end and adapted to lie in spider form in a horizontal plane, the arms at their free ends only having downwardly curved portions forming hooks adapted to embrace the circular rim of a vessel upon which the article is to be supported.

2. As a new article of manufacture, a plurality of straight and rigid rods, pivotally connected at one end and adapted to lie in spider form in a horiztontal plane, the arms at their free ends only having downwardly curved portions forming hooks adapted to either embrace the circular rim of a vessel upon which the article is supported, or to act as feet to support the article with its rods in spider form upon a horizontal surface.

3. A support comprising a plurality of straight and rigid arm members arranged to lie in a horizontal plane and having eyes formed at one of the extreme ends thereof, a pivot pin engaged in the said eyes when the same are aligned one with the other, and hook members formed at the extreme opposite ends of said arm members, said hook members being adapted to embrace the rim of a vessel when said arm members are swung on the pivot pin to spider form and to act as feet to sustain the support in position on a horizontal surface.

In testimony whereof I have affixed my signature.

JOSEPH H. JACOBS.